(12) United States Patent
Harris (10) Patent No.: US 7,372,688 B2
(45) Date of Patent: May 13, 2008

(54) PROTECTION DEVICES AND METHODS FOR PREVENTING THE FLOW OF UNDESIRABLE DIFFERENTIAL MODE TRANSIENTS

(75) Inventor: Richard Harris, Palo Alto, CA (US)

(73) Assignee: FulTec Semiconductor, Inc., Mountain View, CA (US)

( * ) Notice: Subject to any disclaimer, the term of this patent is extended or adjusted under 35 U.S.C. 154(b) by 178 days.

(21) Appl. No.: 11/097,452

(22) Filed: Apr. 1, 2005

(65) Prior Publication Data

US 2005/0243496 A1  Nov. 3, 2005

(51) Int. Cl.
*H02H 9/06* (2006.01)
(52) U.S. Cl. .................................... 361/119
(58) Field of Classification Search .............. 361/118, 361/119
See application file for complete search history.

(56) References Cited

U.S. PATENT DOCUMENTS

| 5,694,285 | A | | 12/1997 | Lee et al. | |
|---|---|---|---|---|---|
| 5,742,463 | A | * | 4/1998 | Harris | ................... 361/88 |
| 6,298,134 | B1 | * | 10/2001 | Curry | ................... 379/412 |
| 6,839,215 | B2 | * | 1/2005 | Le Creff et al. | ........... 361/119 |
| 2005/0243483 | A1 | * | 11/2005 | Chen et al. | ................... 361/38 |

FOREIGN PATENT DOCUMENTS

| JP | 03-124220 | 5/1991 |
|---|---|---|
| WO | WO 00/05798 | 2/2000 |

OTHER PUBLICATIONS

Authoritative Dictionary Of IEEE Standard Terms (Seven edition).*

* cited by examiner

*Primary Examiner*—Michael Sherry
*Assistant Examiner*—Boris Benenson
(74) *Attorney, Agent, or Firm*—Lumen Patent Firm, Inc.

(57) ABSTRACT

A differential mode surge protection apparatus includes first and second solid state protection devices in series between respective input and output connection points. The apparatus may be provided in conjunction with a common mode protection apparatus such as an isolation transformer. Alternatively, the apparatus may be provided integrated into a single miniaturized protection package. In a preferred embodiment, the apparatus includes a surge arrestor arranged to supplement protection conferred by the first and second solid state protection devices. The surge arrestor is capable of being triggered prior to breakdown of either the first or second solid state protection devices. The apparatus may be incorporated into digital processing cards such as LAN cards and also into cables to conveniently provide differential mode protection.

21 Claims, 10 Drawing Sheets

PROTECTION DEVICES AND METHODS FOR PREVENTING THE FLOW OF UNDESIRABLE DIFFERENTIAL MODE TRANSIENTS

CROSS-REFERENCE TO RELATED APPLICATIONS

This application claims priority from PCT Application Number PCT/AU2003/001326 filed Oct. 8, 2003, which claims priority from Australian Patent Application Number 2002951888 filed Oct. 8, 2002. Both applications are hereby incorporated by reference.

FIELD OF THE INVENTION

The present invention relates to electrical surge protection devices, and more particularly to protection devices and methods for preventing the flow of undesirable differential mode transients.

BACKGROUND TO THE INVENTION

Figure 1:
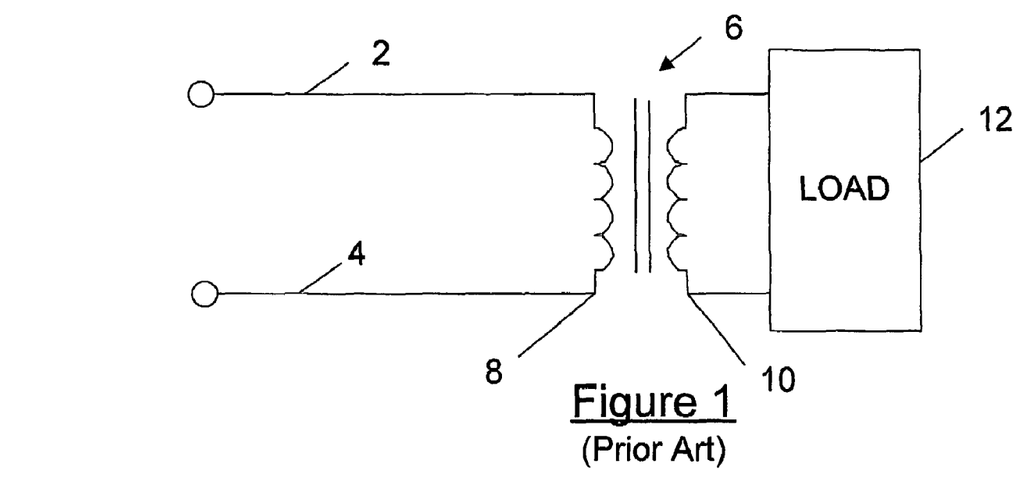
FIG. 1 is a schematic diagram of a prior art common mode protection circuit.
Figure 2:
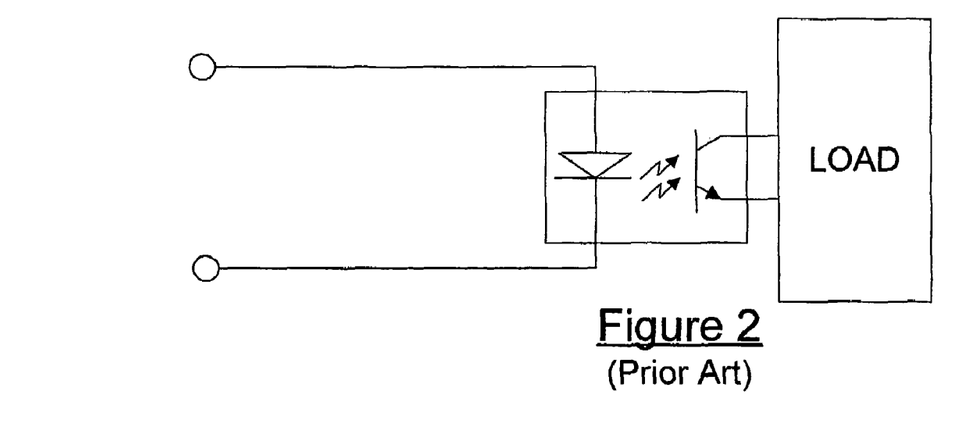
FIG. 2 is a schematic diagram of a further prior art common mode protection circuit.

Wherever electronic circuitry is coupled to an external cable run, a risk of damage to the circuitry, due to the transmission of transient overvoltages by the cable run, may occur. Such overvoltages may be due to any one of several factors. For example, lightning, electrostatic discharge, or malfunction of equipment at a remote end of the cable may be responsible. Several techniques exist for isolating circuitry from potentially damaging surges. These include, inductive coupling as shown in FIG. 1, capacitive coupling, and opto-isolation as shown in FIG. 2. Isolation transformers are usually used to implement inductive coupling.

FIG. 1 is a schematic diagram of a typical arrangement whereby a cable including a pair of conductors 2 and 4 terminate on an isolation transformer 6 which is connected to a load 12. In the event of a common mode voltage surge, the potential on both conductors 2 and 4 typically varies in the same manner, thereby causing substantially zero net current to flow through the primary coil 8 of transformer 6. As a result, the common mode transient does not induce a fault current in secondary coil 10, and so isolation transformer 6 provides common mode protection to load 12.

However, in the event that a voltage transient affects one of conductors 2 and 4 substantially more than the other, then a surge current typically flows through primary coil 8 and induces a transient voltage across the output terminals of secondary coil 10. The surge current may damage the isolation device and may also damage the equipment that is intended to be protected. Consequently, while an isolation transformer provides a good measure of protection from common mode transients, it does not provide protection from differential mode surges.

Figure 3:
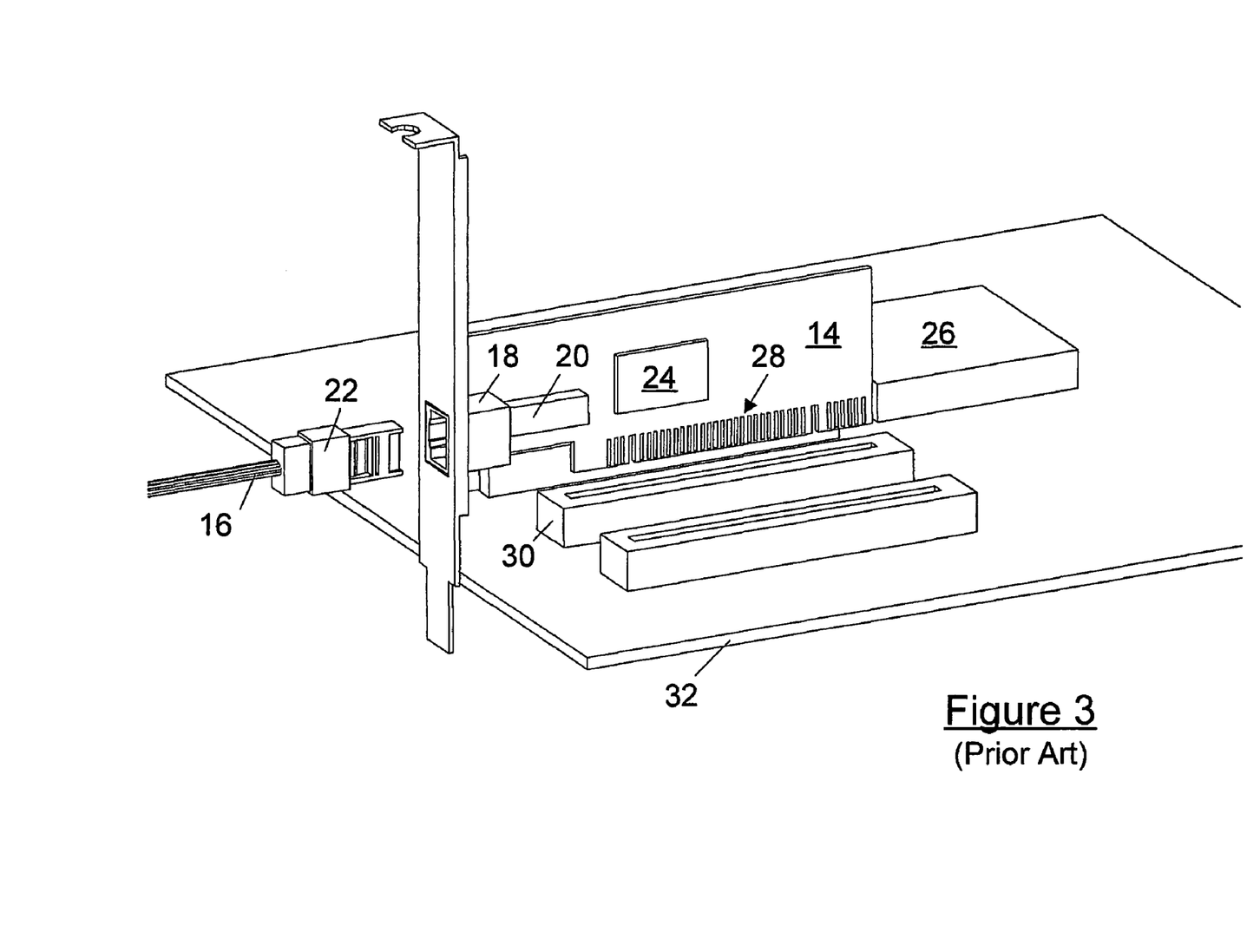
FIG. 3 depicts the external appearance of a prior art network interface card.

One area where isolation transformers are used significantly is in the implementation of local area computer data networks (LANs). With reference to FIG. 3, a digital processing card in the form of a network interface card (NIC), or as it is often called a "LAN card," couples to J8-45 plug 22 of LAN cable 16 by means of J8-45 socket 18. LAN card 14 includes an isolation transformer module 20 that couples socket 18 to a data processing chip 24, which in turn communicates with the central processor 26 of a workstation by means of PCI slot connectors 28. Those PCI slot connectors 28 are received into a PCI connector, 30 which is in turn mounted on a mainboard 32 of the workstation.

Figure 4:
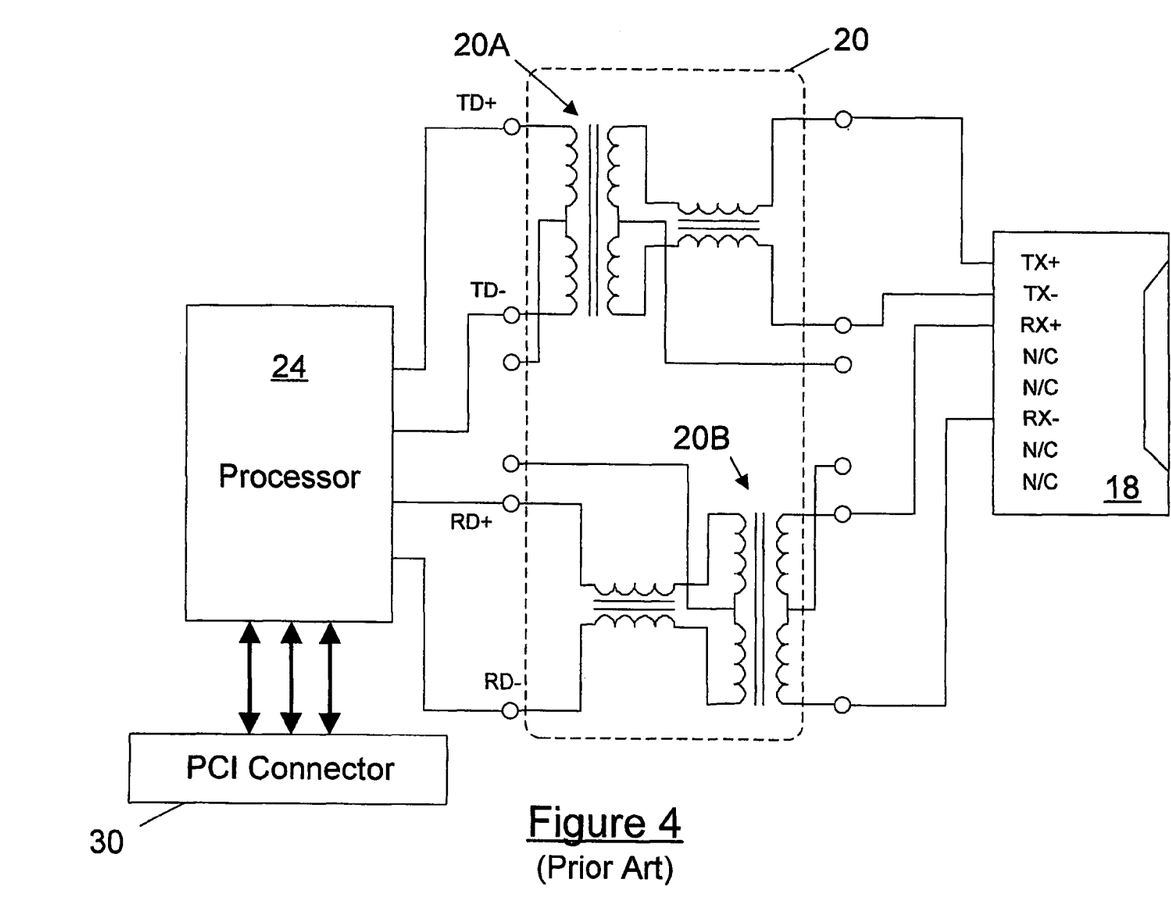
FIG. 4 is a schematic diagram of the network interface card of FIG. 3.

FIG. 4 is a schematic diagram of the prior art card of FIG. 3, wherein like indicia are used to refer to like components. The card receives and transmits data pulses by means of respective balanced twisted pair wires that are enclosed in LAN cable 16 and that terminate on the RX+ and RX− pins and TX+ and TX− pins of J8-45 socket 18.

Isolation module 20 includes a pair of transformers 20A and 20B which respectively provide isolation for processing chip 24 from transients on the transmit and receive twisted pairs. As previously explained, isolation transformers 20A and 20B usually provide considerable immunity from damaging common mode transients but not from differential mode transients. For example, in the event of a voltage transient occurring at the RX+ pin but not on the RX− pin, that transient most likely will be transmitted across the isolation transformer and may damage processing chip 24.

It is therefore desirable to provide a convenient means for addressing the problems posed by differential mode transients as discussed above.

SUMMARY OF THE INVENTION

According to an embodiment, a differential mode surge protection apparatus comprises: a pair of input connection points and a corresponding pair of output connection points; a first unipolar solid state protection device in series between a first one of the pair of input connection points and a first one of the corresponding pair of output connection points; and a second unipolar solid state protection device in series between a second one of the pair of input connection points and a second one of the corresponding pair of output connection points.

The first and second unipolar solid state protection devices may be integrated into a single miniaturized protection package. A surge arrestor may be arranged to supplement protection conferred by the first and second unipolar solid state protection devices. It may be capable of being triggered prior to breakdown of either the first or second unipolar solid state protection devices. The surge arrestor may be connected across the input connection points.

The first and second unipolar solid state protection devices may comprise a matched pair of unipolar transient blocking units (TBUs), each unipolar transient blocking unit including two series connected field effect transistors.

The differential mode surge protection apparatus may further comprise a common mode isolation device disposed between the first unipolar solid state protection device and the second unipolar solid state device and the output connection points. The common mode isolation device may comprise an isolation transformer. Alternatively, the common mode isolation device may comprise another suitable device such as an opto-isolator.

According to another embodiment, the differential mode protection apparatus may be provided in combination with a digital signal processing card such as a LAN card. The unipolar solid state protection devices may be disposed between a common mode isolation device of the digital signal processing card and external connection points of the digital signal processing card. Alternatively, the unipolar solid state protection devices may be disposed between an output side of the isolation device and a digital signal processing chip of the card.

According to a further embodiment, a cable may be provided that includes one or more of the differential mode surge protection apparatuses. In that case the pair of input connection points may terminate upon a first connector of the cable, and the output connection points may terminate upon a second connector of the cable. The first connector may comprise a socket, and the second connector may comprise a plug. Alternatively, the first connector may comprise a plug, and the second connector may comprise a plug. Typically the cable comprises a LAN cable and the first and second connectors comprise LAN cable connectors.

Further preferred features of the various aspects of the invention will be apparent from the following description of preferred embodiments, which will be made with reference to a number of figures.

DETAILED DESCRIPTION OF THE PREFERRED EMBODIMENTS

Figure 5:
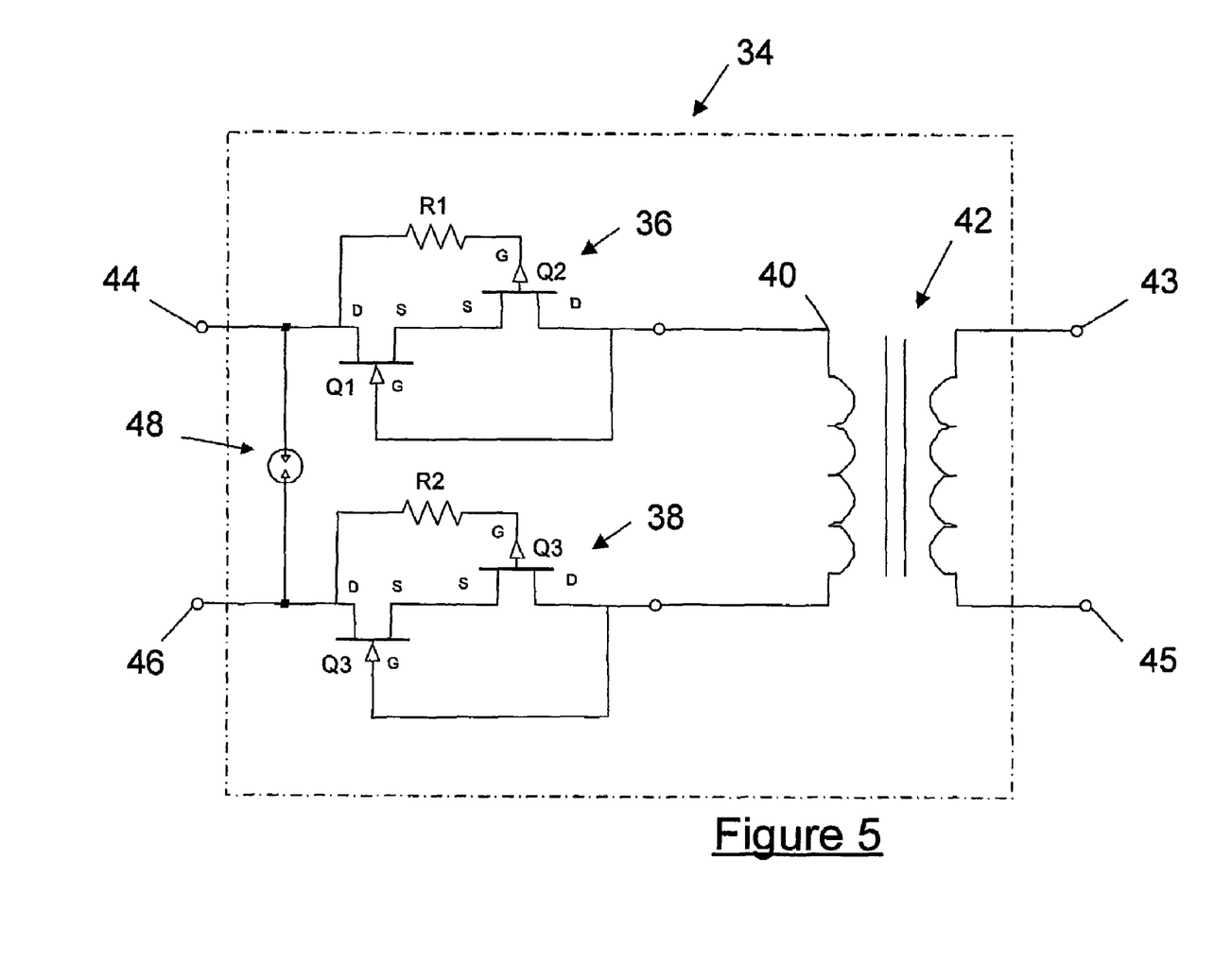
FIG. 5 is a schematic diagram of surge protection module according to an embodiment.

Referring now to FIG. 5, an isolation module 34 according to an embodiment is depicted. Isolation module 34 includes a common mode isolation device 42, which comprises a transformer. It is understood that common mode isolation device 42 could instead be some other common mode isolation device such as an opto-isolator. Isolation module 34 includes two identical series connected unipolar transient blocking units (TBUs) 36 and 38 connected at respective sides of primary coil 40 of transformer 42.

A TBU is a transistor device configured to open-circuit once the current through it reaches a certain predetermined trigger level. TBU 36 consists of two depletion mode FETs being N-channel FET Q1 and P-channel FET Q2. Q1 and Q2 are connected with their conduction paths in series. The gate electrode of transistor Q1 is coupled to the drain electrode of transistor Q2. The source electrodes of Q1 and Q2 are coupled to each other and the drain electrode of transistor Q1 is coupled to a first terminal 44. Resistor R1 extends between the drain electrode of Q1 and the gate electrode of Q2. The drain of Q2 is connected to a first side of primary coil 40. In effect, TBU 36 functions as a fuse for positive current flowing from terminal 44 through to the primary coil. The structure of TBU 38 is identical to that of TBU 36 so that TBU 38 acts as a fuse for positive current flowing from terminal 46 towards primary coil 40. TBU 38 and TBU 36 may be selected so that they have as close as possible insertion loss in order that the balance of the circuit is maintained.

TBUs 36 and 38 protect a load connected across terminals 43 and 45 from differential surge currents by triggering to an open circuit when the current through the load reaches the preset trigger level. If the differential current into terminal 44 attains the trigger level then TBU 36 would open-circuit. Alternatively if the differential current flowing out of terminal 44 attains the trigger level then TBU 38 would trigger. Of course, the TBUs could be reverse-orientated relative to the configuration depicted in FIG. 5. In that case if the differential current into terminal 44 attains the trigger level then TBU 38 would open circuit, and conversely if the differential current flowing out of terminal 44 attained the trigger level then TBU 36 would trigger.

In the event that the voltage across a triggered TBU continues to rise, then eventually a breakdown voltage would be reached at which the TBU conducts again. At present TBUs with breakdown voltages up to 800V are available. In order to provide protection from surges that exceed the breakdown voltage, surge arrestor 48 may be included. A gas arrestor, as depicted at item 48 is typically used. However, any suitable surge arrestor could be used as an alternative. Surge arrestor 48 is connected line-to-line across terminals 44 and 46 and is selected so that it will trigger at 90% of the TBUs' breakdown voltage. Consequently, in the event of a differential mode surge approaching the breakdown voltage of the TBUs, the surge arrestor would trigger and short the surge before it can cause breakdown of the triggered TBU and subsequently be transmitted across isolation transformer 42 to potentially damage any load connected between output terminals 43 and 45.

Suitable TBU's may be purchased from Fultec Pty Ltd of Building 76A, University of Queensland Campus, St Lucia, Brisbane, Queensland, Australia. Circuits for implementing suitable TBUs are described in granted U.S. Pat. No. 5,742,463 and in International Patent Application No. PCT/AU03/00175, both by the present inventor. The descriptions of both U.S. Pat. No. 5,742,463 and PCT/AU03/00175 are hereby both incorporated in their entireties by cross-reference.

Figure 6:
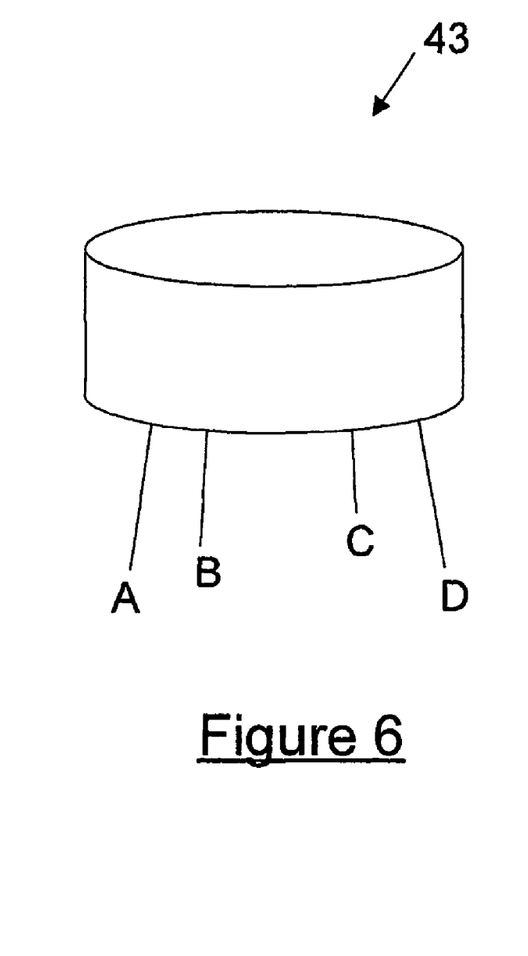
FIG. 6 is a schematic diagram of a differential mode protection device package according to an embodiment.
Figure 7:
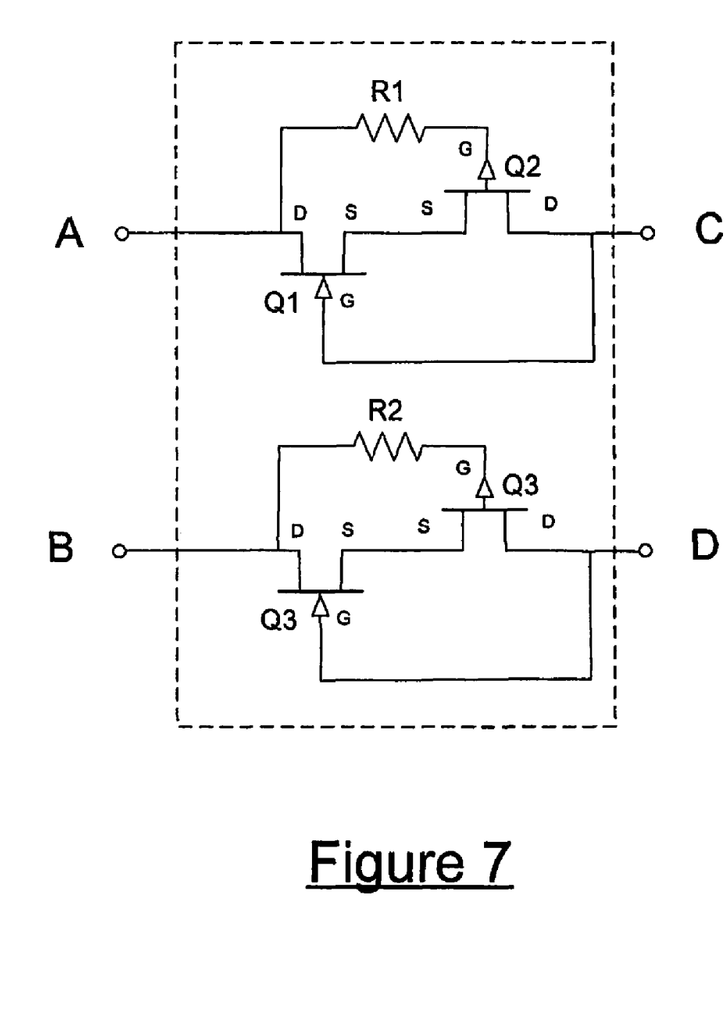
FIG. 7 is a schematic diagram of a circuit of the differential mode protection device package of FIG. 6.
Figure 8:
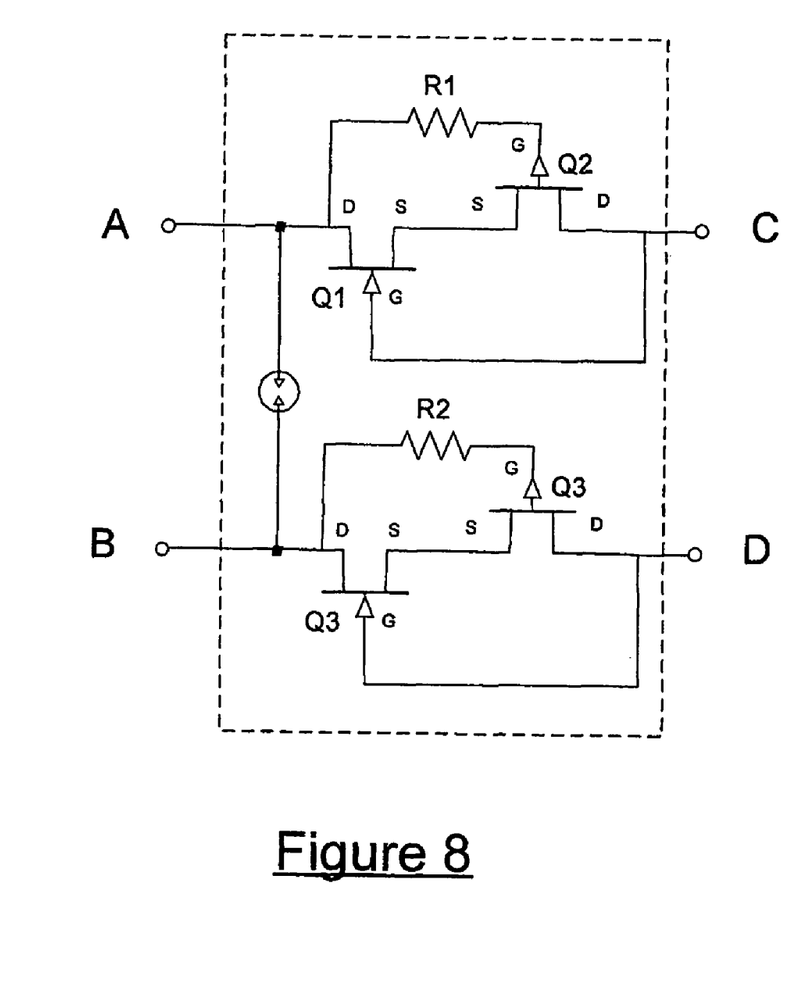
FIG. 8 is a schematic diagram of a variation to the circuit of the differential mode protection device package of FIG. 7.

With reference to FIG. 6, according to a further embodiment of the invention a differential mode protection device 43 is conveniently provided in a single package having four connectors A, B, C, D as shown. The device may be provided with or without a surge arrestor as desired. A schematic diagram of the internal circuit of device 43 without a surge arrestor is shown in FIG. 7, whereas a schematic for a further version with surge arrestor is shown in FIG. 8. Further variations of the device are possible. For example an eight terminal version of the device might be provided including two of the circuits of FIG. 7 or FIG. 8.

Figure 9:
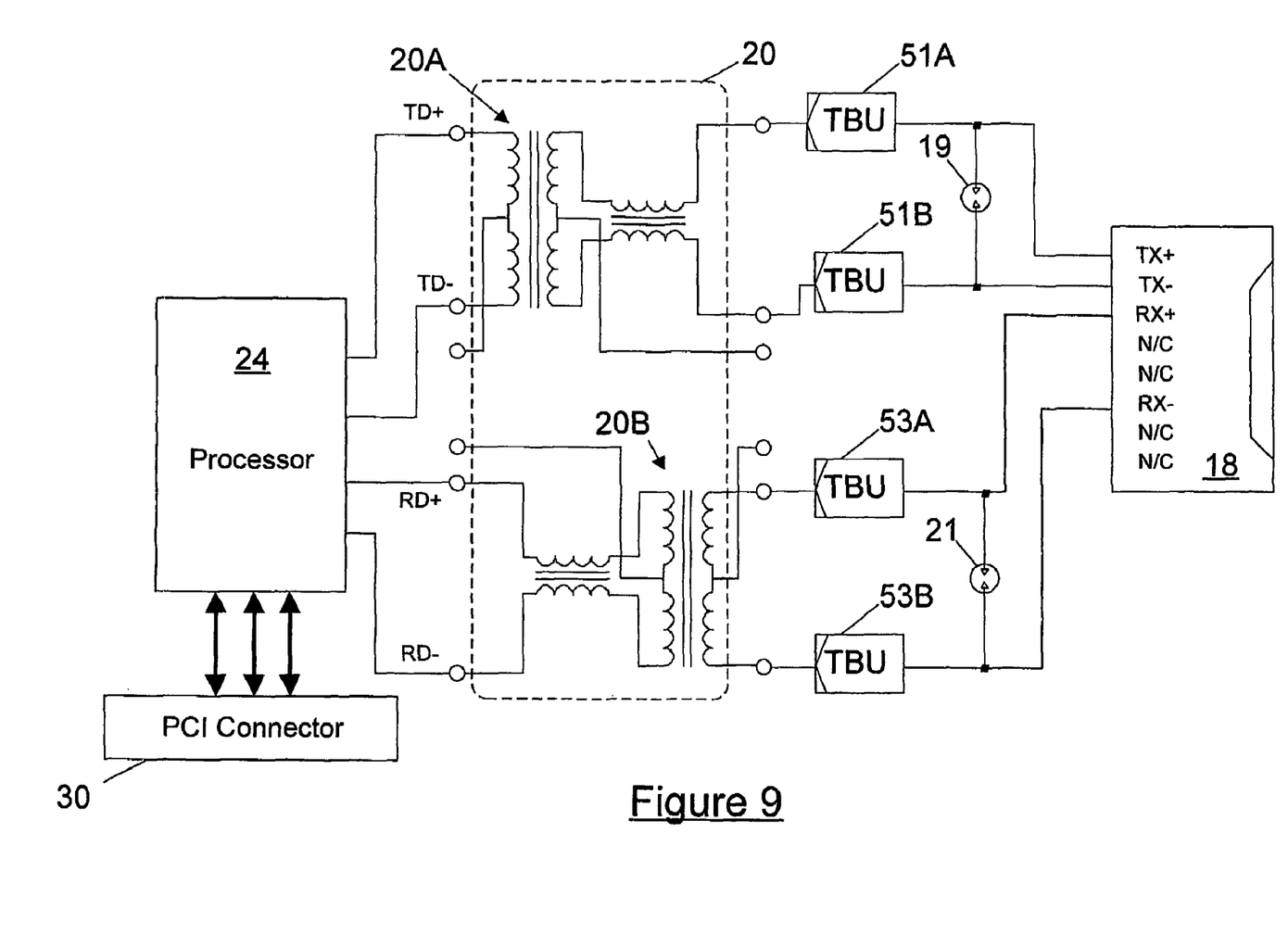
FIG. 9 is a schematic diagram of a network interface card according to an embodiment.

A schematic diagram of a digital processing card, in the present example a LAN card, according to a preferred embodiment is shown in FIG. 9. It is noted that the LAN card of FIG. 9 incorporates two pairs of TBUs 51A, 51B and 53A, 53B placed in series with the TX+, TX−, and RX+, RX− terminals of socket 18 respectively. (The TBUs are each identical to TBUs 36 and 38 of FIG. 5 and might be provided in an eight terminal version of device 43 of FIG. 6.) Surge arrestors 19 and 21 are connected across the TX+, TX− and RX+, RX− pins, respectively. The surge arrestors may be selected so that they will trigger at 90% of the TBUs' breakdown voltage. As previously explained, in the event of a differential mode surge approaching the breakdown voltage of the TBUs, the surge arrestors would trigger and short the surge before it can cause breakdown of the TBUs and subsequently be transmitted across isolation transformer to potentially damage logic circuitry 24.

Figure 10:
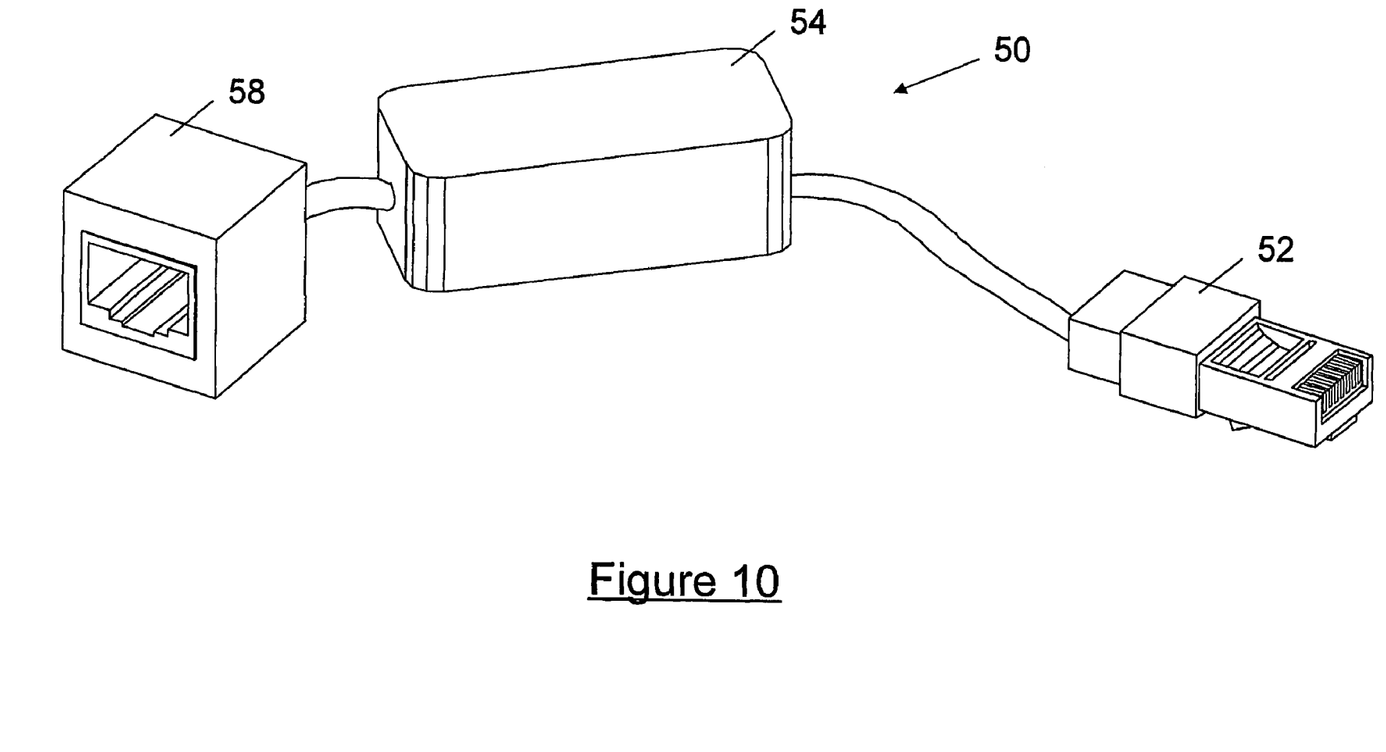
FIG. 10 depicts the external appearance of a differential mode surge protection apparatus according to a further embodiment.
Figure 11:
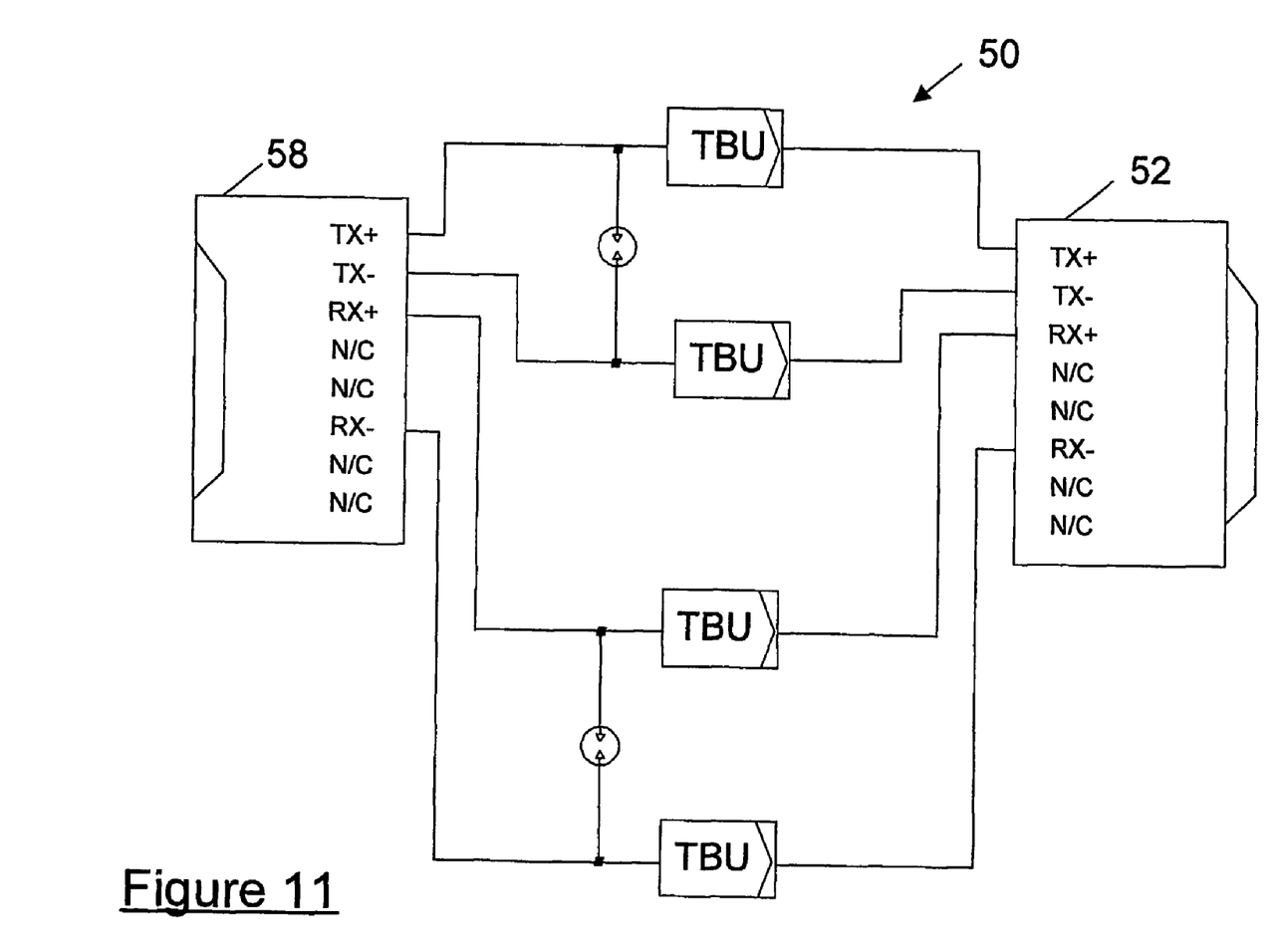
FIG. 11 is a schematic diagram of the protection apparatus of FIG. 7.

FIG. 10 depicts the external appearance of a differential mode surge protector 50 according to a further embodiment while FIG. 11 is a corresponding schematic diagram. Surge protector 50 includes a J8-45 plug 52 for connection to a socket of a LAN card. The J8-45 plug is coupled to a differential mode protection module 54 which includes TBU's and surge arrestors as shown in FIG. 11. The surge protector further includes a J8-45 socket 58 which is coupled to circuitry in module 54 and which is intended to receive a LAN cable.

Figure 12:
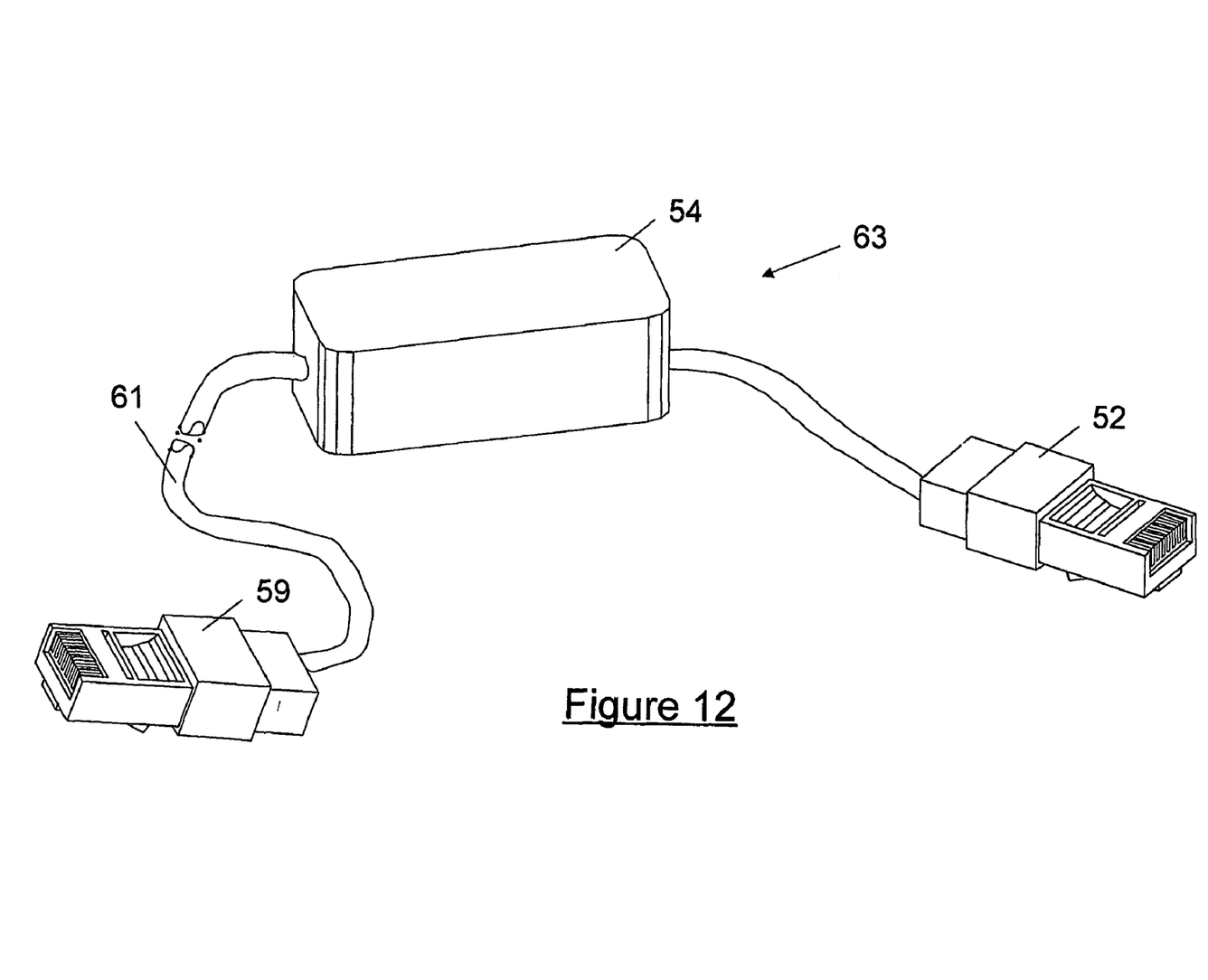
FIG. 12 depicts the external appearance of a differential mode surge protection apparatus according to a further embodiment.

FIG. 12 is a variation of the differential mode surge protector of FIGS. 10 and 11 comprising a cable 63 that incorporates differential mode protection. Cable 63 includes a connector 52 for connection to a digital processing card. In the present example it is intended that cable 63 be a LAN cable and so connectors 52 and 59 are J8-45 plugs although other connectors might be used in other applications. A differential mode protection module 54, identical to the one in FIG. 10 and containing the circuitry depicted in FIG. 11, is coupled to connector 52. A relatively long run of cable 61 connects protection module 54, which includes TBU's and surge arrestors as shown in FIG. 11, to remote connector 59. In use it is intended that connector 52 be plugged into a digital processing card such as a LAN card whereas connector 59 is plugged into a remote device such as a network hub. If desired, a second module may be incorporated proximal to plug 59. Variations to the cable shown in FIG. 12 are possible. For example, the circuitry that is provided inside housing 54 might be integrated into one or the other of connectors 52 and 59.

Although the present invention has been described in terms of preferred embodiments, it is not intended that the invention be limited to these embodiments. Equivalent methods, structures, arrangements, processes, steps, and other modifications apparent to those skilled in the art would fall within the scope of the following claims.

What is claims is:

1. A differential mode surge protection apparatus comprising:
   a. a first input connection point and a corresponding first output connection point;
   b. a second input connection point and a corresponding second output connection point;
   c. a first differential mode unipolar solid state protection device, wherein said first device is disposed in series between said first input connection and said first output point, whereby said first unipolar solid state protection device is disposed to operate to limit electrical current in only one direction from said first input point to said first output point;
   d. a second differential mode unipolar solid state protection device, wherein said second device is disposed in series between said second input connection and said second output point, whereby said second unipolar solid state protection device is disposed to operate to limit said electrical current in only one direction from said second input point to said second output point, whereas both said unipolar solid state protection devices are aligned to limit current in the same direction relative to said input and said output connections; and
   e. an isolating device connected between said first output connection and said second output connection, wherein said isolating device is a common mode protection device, whereas said unipolar solid state protection devices provide differential mode protection and said isolation device provides common mode protection.

2. The apparatus according to claim 1, wherein said first and second unipolar solid state protection devices are integrated into a single miniaturized protection package.

3. The apparatus according to claim 1 or 2, further comprising a surge arrestor arranged to supplement protection conferred by said first and second unipolar solid state protection devices, wherein said surge arrestor is capable of being triggered prior to the breakdown of either said first or said second unipolar solid state protection device.

4. The apparatus of claim 3, wherein said surge arrestor is connected across said pair of input connection points.

5. The apparatus according to claim 4, wherein said first and said second unipolar solid state protection devices comprise a matched pair of unipolar transient blocking units (TBUs), each said unipolar transient blocking unit including two series connected field effect transistors.

6. The apparatus according to claim 5, wherein said common mode isolation device comprises an isolation transformer.

7. A cable comprising one or more apparatuses according to claim 6, wherein said pair of input connection points terminate upon a first connector of said cable, and wherein said pair of output connection points terminate upon a second connector of said cable.

8. The cable according to claim 7, wherein the said first connector comprises a socket and said second connector comprises a plug.

9. The cable according to claim 7, wherein said first connector comprises a plug and said second connector comprises a plug.

10. The cable according to claim 7, wherein the said cable comprises a LAN cable and said first and second connectors comprise LAN cable connectors.

11. The apparatus according to claim 6, being in combination with a digital signal processing card.

12. The apparatus according to claim 11, wherein said a common mode isolation device is part of said digital signal processing card.

13. The apparatus according to claim 11, wherein said digital signal processing card comprises a LAN card.

14. The apparatus according to claim 5, wherein said common mode isolation device comprises an opto-isolation device.

15. A cable comprising one or more apparatuses according to claim 14, wherein said pair of input connection points terminate upon a first connector of said cable, and wherein said pair output connection points terminate upon a second connector of said cable.

16. The cable according to claim 15, wherein said first connector comprises a socket and said second connector comprises a plug.

17. The cable according to claim 15 wherein said first connector comprises a plug and said second connector comprises a plug.

18. The cable according to claim 15, wherein said cable comprises a LAN cable and said first and second connectors comprise LAN connectors.

19. A connector comprising one or more apparatuses according to claim 1, wherein the said pair of input connection points terminate upon a first connector input, and wherein the said pair of output connection points terminate upon a second connector output, whereas said connector further comprises pins for connection to a PC board.

20. A differential mode surge protection apparatus comprising:
- a pair of input connection points and a corresponding pair of output connection points;
- a transformer having a primary coil and a secondary coil, wherein said primary coil is disposed in series between said pair of input connections points and said secondary coil is disposed in series between said pair of output connection points, whereas said primary coil comprises a first primary coil end and a second primary coil end and said secondary coil comprises a first secondary coil end and a second secondary coil end;
- a first unipolar solid state protection device in series between a first one of said pair of input connection points and said first primary coil end; and
- a second unipolar solid state protection devices in series between a second one of said pair of input connection points and said second primary coil end; whereby said unipolar solid state protection devices are disposed to operate to limit said electrical current in only one direction from said input connection points to said output connection points, whereas both said unipolar solid state protection devices are aligned to limit current in the same direction relative to said input and said output connection points.

21. A differential mode surge protection apparatus comprising:
a. a first input connection point and a corresponding first output connection point;
b. a second input connection point and a corresponding second output connection point;
c. an isolation device, wherein said isolation device provides common mode isolation between the output terminal and further circuitry, but is exposed to damage from differential mode surges,
d. a first differential mode unipolar transient blocking unit (TBU), wherein said first TBU is disposed in series between said first input connection and a first end of said primary coil, whereby said first TBU is disposed to operate to limit electrical current in only one direction from said first input point to said first end of said primary coil;
e. a second differential mode unipolar TBU, wherein said second TBU is disposed in series between said second input connection and a second end of said primary coil, whereby said second TBU is disposed to operate to limit electrical current in only one direction from said second input point to said second end of said primary coil, whereas both said TUB's are aligned to limit current in the same direction relative to said isolation device connections; and
f. a surge arrestor, wherein said surge arrestor is disposed between said first input connection point and said second input connection point, whereby said surge arrestor is capable of being triggered prior to the breakdown of either said first or said second TBU, whereas said first TBU and said second TBU provide differential mode protection and said surge arrestor or said transformer provides common mode protection.

* * * * *